(12) United States Patent
Fabian et al.

(10) Patent No.: US 7,284,726 B2
(45) Date of Patent: Oct. 23, 2007

(54) SELF EXTINGUISHING COMPOSITE PRIMARY STRUCTURE

(75) Inventors: Edward J. Fabian, Oxford, CT (US);
Lauren Robert Napier, Madison, CT (US); James S. Giampapa, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/781,077

(22) Filed: Feb. 17, 2004

(65) Prior Publication Data

US 2005/0224637 A1    Oct. 13, 2005

(51) Int. Cl.
*B64C 27/04* (2006.01)
*B64C 1/12* (2006.01)

(52) U.S. Cl. ............... 244/17.11; 244/129.2; 244/133

(58) Field of Classification Search ........ 244/126, 244/129.2, 133, 17.11; 428/175, 190, 193, 428/196; 442/59; 169/62
See application file for complete search history.

(56) References Cited

U.S. PATENT DOCUMENTS

| | | | | |
|---|---|---|---|---|
| 2,728,702 A * | 12/1955 | Simon | | 244/126 |
| 2,744,042 A * | 5/1956 | Pace | | 264/46.5 |
| 3,644,168 A * | 2/1972 | Bonk et al. | | 442/213 |
| 3,822,762 A * | 7/1974 | Crispin et al. | | 181/292 |
| 3,964,527 A * | 6/1976 | Zwart | | 141/8 |
| 4,054,477 A * | 10/1977 | Curran | | 156/197 |
| 4,299,872 A * | 11/1981 | Miguel et al. | | 428/117 |
| 4,598,007 A * | 7/1986 | Kourtides et al. | | 428/116 |
| 4,680,216 A * | 7/1987 | Jacaruso | | 428/116 |
| 4,687,691 A * | 8/1987 | Kay | | 428/73 |
| 4,767,656 A * | 8/1988 | Chee et al. | | 428/116 |
| 4,797,312 A * | 1/1989 | Sherwood | | 428/117 |
| 4,964,936 A * | 10/1990 | Ferro | | 156/242 |
| 5,000,998 A * | 3/1991 | Bendig et al. | | 428/117 |
| 5,020,481 A * | 6/1991 | Nelson | | 122/494 |
| 5,034,256 A * | 7/1991 | Santiso et al. | | 428/73 |
| 5,141,804 A * | 8/1992 | Riefler et al. | | 156/292 |
| 5,251,849 A * | 10/1993 | Torres | | 244/117 R |
| 5,338,594 A * | 8/1994 | Wang et al. | | 428/117 |
| 5,390,580 A * | 2/1995 | Gibbons et al. | | 86/50 |
| 5,415,364 A * | 5/1995 | Grant | | 244/17.11 |
| 5,443,884 A * | 8/1995 | Lusignea et al. | | 428/116 |
| 5,518,796 A | 5/1996 | Tsotsis | | |
| 5,567,499 A * | 10/1996 | Cundiff et al. | | 428/116 |
| 5,569,508 A * | 10/1996 | Cundiff | | 428/117 |
| 5,580,502 A * | 12/1996 | Forster et al. | | 264/46.5 |
| 5,667,866 A * | 9/1997 | Reese, Jr. | | 428/116 |
| 5,762,145 A * | 6/1998 | Bennett | | 169/62 |

(Continued)

OTHER PUBLICATIONS

"Rohacell PMI Foam Cores—The right choice for your Sandwich Component", www.nfgsales.com/rohm.htm, pp. 1-3.*

(Continued)

*Primary Examiner*—Rob Swiatek
(74) *Attorney, Agent, or Firm*—Bachman & LaPointe

(57) ABSTRACT

A helicopter with one or more components formed from a self extinguishing composite primary structure material to provide increased passenger safety. The self extinguishing composite primary structure material has a core formed from a fire retardant material, which core has a first surface and a second surface, and at least one ply of a structural graphite prepreg material bonded to each of the first surface and the second surface.

20 Claims, 3 Drawing Sheets

U.S. PATENT DOCUMENTS

| | | | | |
|---|---|---|---|---|
| 5,851,326 | A * | 12/1998 | Custer et al. | 156/89.22 |
| 5,851,336 | A * | 12/1998 | Cundiff et al. | 156/272.2 |
| 5,997,985 | A * | 12/1999 | Clarke et al. | 428/116 |
| 6,114,652 | A * | 9/2000 | Clarke et al. | 219/121.71 |
| 6,117,519 | A * | 9/2000 | Burns | 428/116 |
| 6,156,146 | A * | 12/2000 | Cundiff | 156/213 |
| 6,179,943 | B1 * | 1/2001 | Welch et al. | 156/160 |
| 6,189,833 | B1 * | 2/2001 | Ambrose et al. | 244/129.5 |
| 6,375,883 | B1 * | 4/2002 | Sagrati et al. | 264/213 |
| 6,419,776 | B1 * | 7/2002 | Hoopingarner et al. | 156/209 |
| 6,630,093 | B1 * | 10/2003 | Jones | 264/401 |
| 6,630,221 | B1 * | 10/2003 | Wong | 428/117 |
| 6,673,415 | B1 * | 1/2004 | Yamazaki et al. | 428/117 |
| 6,679,969 | B1 * | 1/2004 | Fournier et al. | 156/245 |
| 6,692,681 | B1 * | 2/2004 | Lunde | 264/510 |
| 6,722,611 | B1 * | 4/2004 | Wu et al. | 244/126 |
| 6,739,861 | B2 * | 5/2004 | Cournoyer et al. | 425/520 |
| 6,759,002 | B1 * | 7/2004 | Engwall et al. | 264/510 |
| 6,767,606 | B2 * | 7/2004 | Jackson et al. | 428/118 |
| 6,861,134 | B1 * | 3/2005 | Peters | 428/319.1 |
| 2002/0006523 | A1 * | 1/2002 | Obeshaw | 428/593 |
| 2002/0056788 | A1 * | 5/2002 | Anderson et al. | 244/119 |
| 2002/0178583 | A1 * | 12/2002 | Holman et al. | 29/897 |
| 2003/0098520 | A1 * | 5/2003 | Cournoyer et al. | 264/156 |
| 2003/0146346 | A1 * | 8/2003 | Chapman, Jr. | 244/123 |
| 2004/0126537 | A1 * | 7/2004 | Jackson et al. | 428/118 |
| 2004/0188025 | A1 * | 9/2004 | Anderson et al. | 156/382 |
| 2005/0095380 | A1 * | 5/2005 | Watkins et al. | 428/36.5 |

OTHER PUBLICATIONS

"Specialist Material Distribution", www. perrless-coatings.co.uk/special.htm, pp. 1 of 1.*

"Boeing Mesa Approved Vendor List", pp. 1-125 (see p. 43/125).*

Nomex Motor and Generators, Core Structures, "Avaiation Application for Core Structure of Nomex", DuPont Company, www.dupont.com/nomex/core_main.html, pp. 1/3.*

CMT Material, Inc., "Innovate Tooling Materials for Thermoforming", <http://web.archive.org/web/*/http://www.cmtmaterials.com/>.*

"Syntactic foam." Wikipedia, The Free Encyclopedia. Jun. 24, 2006, 15:04 UTC. Wikimedia Foundation, Inc. Aug. 1, 2006 <http://en.wikipedia.org/w/index.php?title=Syntactic_foam&oldid=60342711>.*

"Glass microsphere." Wikipedia, The Free Encyclopedia. Jun. 17, 2006, 03:55 UTC. Wikimedia Foundation, Inc. Aug. 1, 2006 <http://en.wikipedia.org/w/index.php?title=Glass_microsphere&oldid=59056378>.*

"Aircraft", Answers.com, Aug. 1, 2006, p. 1 or 26 <http://www.answers.com/aircraft&r=67>.*

3M Scotch-Weld Structural Core Splice Adhesive Film AF 3028, 3M Corporation, <www.3m.com>.*

"SynSpand X9899CF Expanding Syntactic Film", Henkel Corporation, <www.aerospace.henkel.com>.*

"Scotch-Weld Structural Adhesive Film AF 191." www.3m.com Sep. 2002. 3M Apr. 18, 2006.

* cited by examiner

SELF EXTINGUISHING COMPOSITE PRIMARY STRUCTURE

BACKGROUND OF THE INVENTION (a) Field of the Invention

The present invention relates to self extinguishing composite primary structures used on helicopters for increasing passenger safety.

(b) Prior Art

Helicopters typically have a number of points where crew and occupants/passengers can exit the helicopter. In the past, these egress points did not provide a desired level of protection for the crew and occupants/passengers should the helicopter be involved in an accident. In particular, these egress points lacked sufficient protection against fire.

SUMMARY OF THE INVENTION

Accordingly, it is an object of the present invention to provide a self extinguishing composite structures which help increase the safety of the crew and the occupants/passengers.

It is a further object of the present invention to provide a helicopter having increased safety.

The foregoing objects are attained by the composite structures of the present invention.

In accordance with the present invention, a self extinguishing composite primary structure broadly comprises a core formed from a fire retardant material, which core has a first surface and a second surface, and at least one ply of a structural graphite prepreg material bonded to each of the first surface and the second surface.

Further, in accordance with the present invention, a helicopter is provided which broadly comprises at least one component formed from said self extinguishing composite primary structure. The component may be an outer skin panel used in the cockpit section of the helicopter, an upper cabin door, a lower cabin door, floors, emergency egress hatches, and an upper door in a transition section.

Other details of the self extinguishing composite primary structure of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
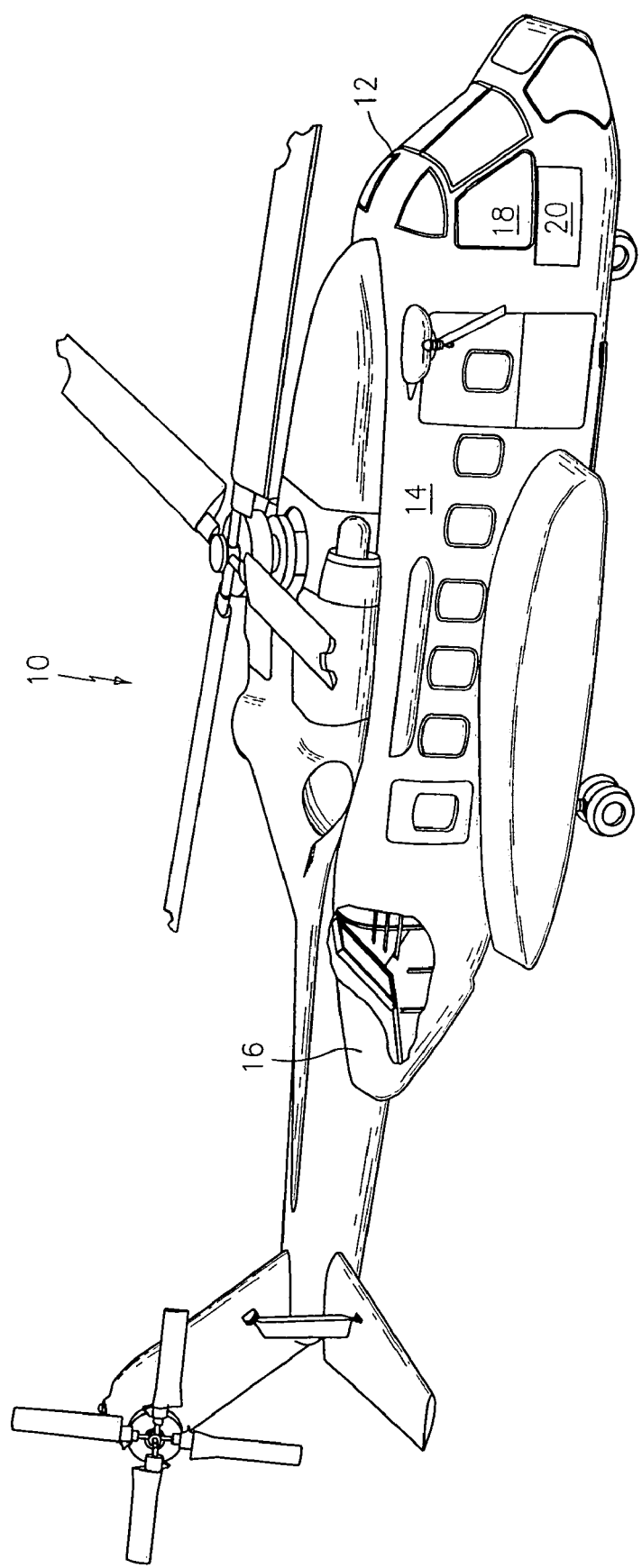
FIG. 1 illustrates a helicopter.
Figure 3:
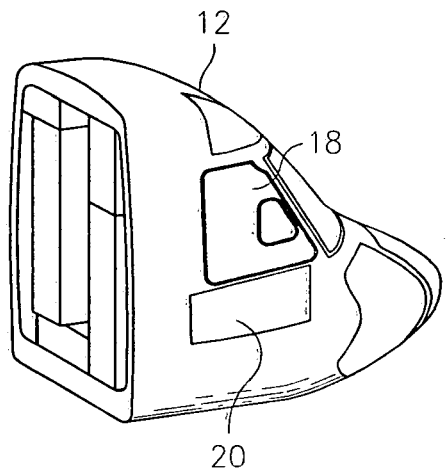
FIG. 3 illustrates a skin panel used in a cockpit section of the helicopter of FIG. 1 formed from the self extinguishing composite structure of the present invention.

Referring now to the drawings, FIG. 1 illustrates a helicopter 10 having a cockpit section 12, a cabin section 14, and a transition section 16. As can be seen in FIGS. 1 and 3, the cockpit section 12 includes having a hatch 18 through which a crew member can egress the helicopter 10. Beneath the hatch 18 is an outer skin panel 20. In order to promote safety during an accident or a crash, it is desirable to form the skin panel 20 from a material which resists fire.

Figure 4:
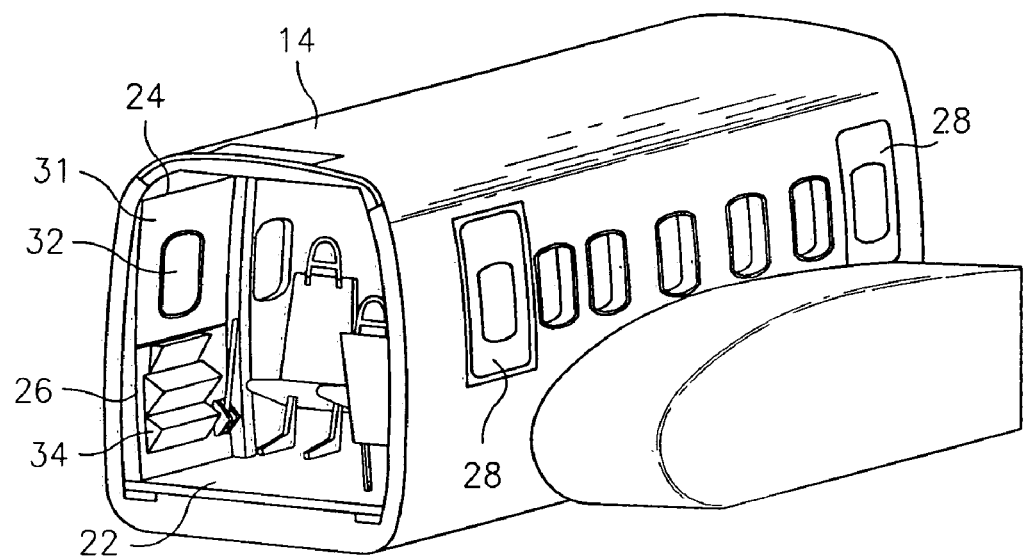
FIGS. 4 and 5 illustrates a cabin section of the helicopter of FIG. 1 having a plurality of components formed from the self extinguishing composite structure of the present invention.
Figure 5:
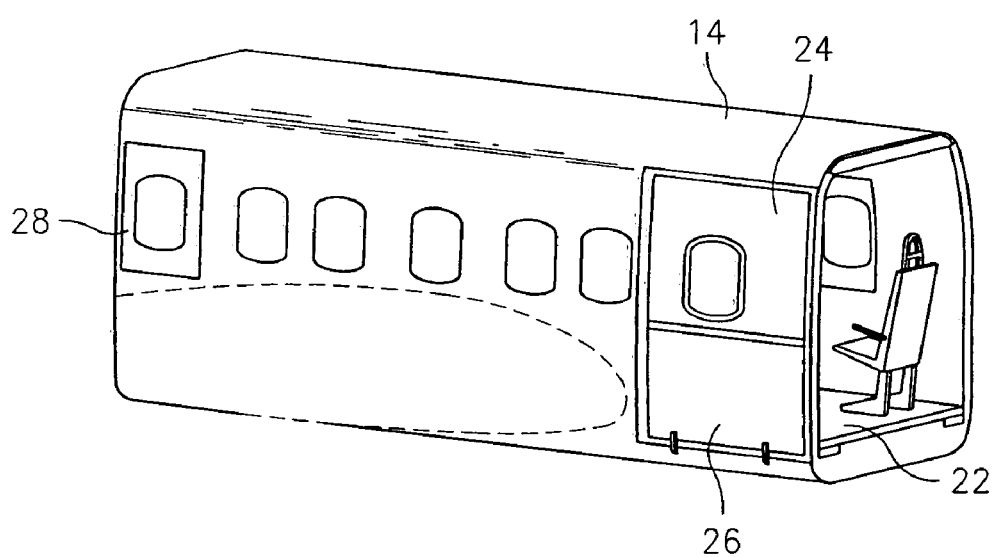

As shown in FIGS. 1, 4, and 5, the cabin section 14 of the helicopter 10 includes a cabin floor 22, an upper door 24 and a lower door 26 on each side of the helicopter 10 through which passengers and crew members can egress the helicopter, and emergency egress hatches 28 on each side of the helicopter 10. Typically, the upper door 24 includes a portion 30 formed from a structural material which surrounds a window 32. The lower door 26 typically has a plurality of steps 34 incorporated into it. In order to promote passenger and crew safety, it is desirable to form each of these components, with the exception of the window 32, from a material which resists fire.

Figure 6:
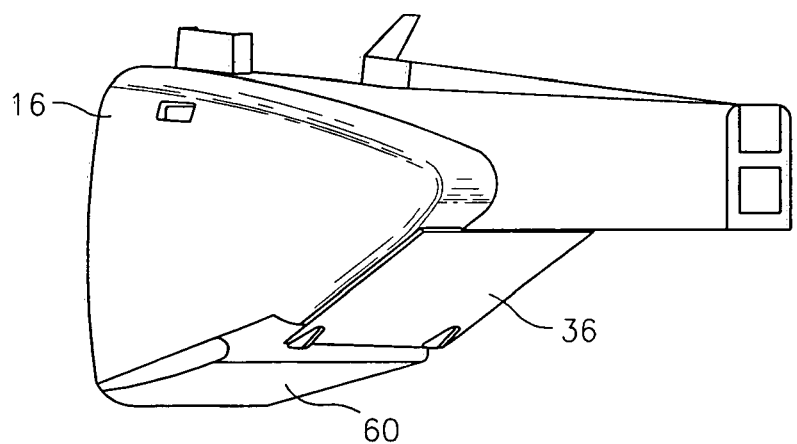
FIG. 6 illustrates a transition section of the helicopter of FIG. 1 having an upper door formed from the self extinguishing composite structure of the present invention.

As shown in FIGS. 1 and 6, the transition section 16 of the helicopter 10 includes an upper door 36 and ramp 60. Once again, in order to promote passenger and crew safety, it is desirable to form the door 36 and ramp 60 from a material which resists fire.

Figure 2:
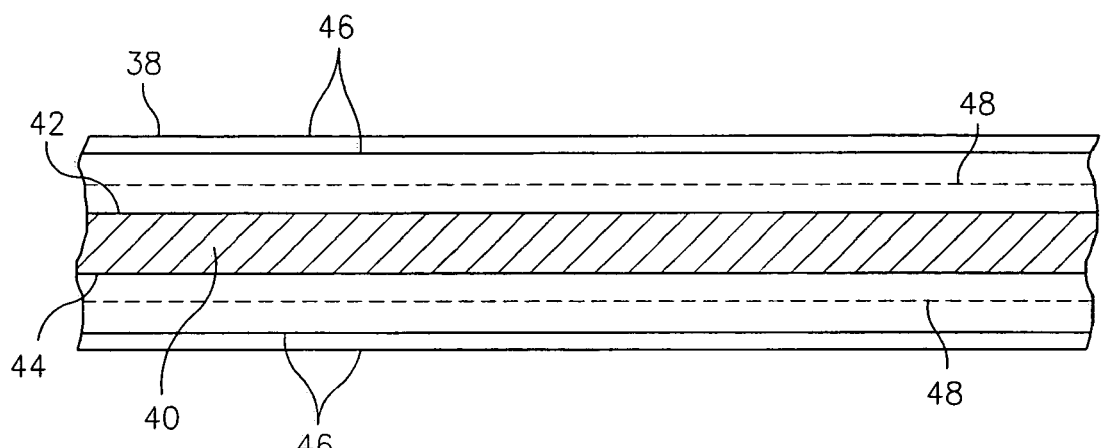
FIG. 2 is a sectional view of a self extinguishing composite structure in accordance with the present invention.

In accordance with the present invention, each of the skin panel 20, the floor 22, the upper door portion 30, the lower door 26 including the steps 34, the emergency egress hatches 28, and the upper door 36 is formed from a self extinguishing composite structure material 38. Referring now to FIG. 2, the self extinguishing composite structure material 38 has a core 40 formed from a fire retardant material. The core 40 has a first surface 42 and a second surface 44 opposed to the first surface 42. The core 40 may be formed from any suitable fire retardant material known in the art which self extinguishes in the event of a fire. In a preferred embodiment, the core 40 has a plurality of honeycomb cells filled with a Fiberglass material. One material which may be used to form the core 40 is a Nomex Acoustic Core sold by Hexcel Corporation.

The self extinguishing composite structure material 38 further has at least one ply of a structural graphite prepreg face sheet bonded to each of the surfaces 42 and 44, in a preferred embodiment of the present invention, a plurality of plies 46 of said structural graphite prepreg face sheet are bonded to the surfaces 42 and 44. Each ply 46 is preferably a 350 degree Fahrenheit cure graphite cloth material impregnated with an epoxy resin material.

Each of the plies 46 is bonded to the surfaces 42 and 44 and to each other by a layer 48 of film adhesive. In a preferred embodiment of the present invention, each film adhesive layer 48 comprises a 350 degree Fahrenheit epoxy structural film adhesive.

While the composite structure material 38 has been shown as being a planar material, the material may be manufactured into any desired shape. For example, the outer skin panel 20, the upper door 24, the lower door 26, the hatches 28, and the door 36 may have any desired shape and/or curvature.

Each of the aforementioned components can be formed by laying one or more skin plies or outer layers 46 of carbon fiber prepeg into a mold. A layer 48 of film adhesive is then placed over the plies or layers. The core 40 is then positioned within the mold. Another layer 48 of epoxy film adhesive is then placed over the core. Finally, at least one additional ply or layer 46 of carbon fiber prepeg is placed on top of the film adhesive. The component is then vacuum bagged and placed in an oven or autoclave and cured at 350 degrees Fahrenheit. The component may be cured with augmented pressure in the oven or autoclave.

As can be seen from the foregoing discussion, a helicopter has been provided which has a desirable set of safety features in the event of a fire resulting from an accident or a crash. Also, in accordance with the present invention, a novel self extinguishing composite structural material has been provided.

It is apparent that there has been provided in accordance with the present invention a self extinguishing composite primary structure which fully satisfies the objects, means and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A helicopter comprising a self extinguishing composite primary structure comprising:
    a core formed from an open cell and a thermal insulating material;
    said core comprising a plurality of honeycomb cells filled with a fiberglass material;
    said core having a first surface and a second surface;
    at least one ply of a structural graphite prepreg material bonded to each of said first surface and said second surface;
    each said ply is bonded to each of said first and second surfaces by an epoxy structural film adhesive; and
    said epoxy structural film adhesive comprising a 350 degree Fahrenheit curing epoxy structural film adhesive.

2. A helicopter comprising a self extinguishing composite primary structure according to claim 1, wherein each said ply is formed from a graphite cloth impregnated with an epoxy resin.

3. A helicopter comprising a lower cabin door including a plurality of steps and each of said steps being formed from said self extinguishing composite primary structure of claim 1.

4. A helicopter comprising a self extinguishing composite primary structure comprising:
    a core formed from a cellular material and a thermal insulating material;
    said core comprising a plurality of honeycomb cells filled solely with fiberglass;
    said core having a first surface and a second surface;
    at least one ply of a structural graphite prepreg material bonded to each of said first surface and said second surface; and
    a plurality of plies of structural graphite prepreg are bonded to each of said first and second surfaces by an epoxy structural film adhesive.

5. A helicopter comprising a self extinguishing composite primary structure according to claim 4, wherein said adhesive comprises a 350 degree Fahrenheit curing epoxy structural film adhesive.

6. A helicopter comprising:
    at least one component formed from a self extinguishing composite material, said self extinguishing composite material comprises a core formed from a fire resisting material, which core comprises a plurality of honeycomb cells filled solely with a fiberglass material and has a first surface and a second surface, and at least one ply of a structural graphite prepreg material bonded to each of the first surface and the second surface, wherein said at least one ply bonded to said first surface forms an exterior surface of said helicopter and said at least one ply bonded to said second surface forming an interior surface of said helicopter.

7. A helicopter according to claim 6, wherein said at least one component comprises an outer skin panel in a cockpit section of said helicopter.

8. A helicopter according to claim 6, wherein said helicopter has a cabin section and said at least one component comprises an upper cabin door in said cabin section.

9. A helicopter according to claim 6, wherein said helicopter has a cabin section and said at least one component comprises a lower cabin door in said cabin section.

10. A helicopter according to claim 6, wherein said helicopter has a cabin section and said at least one component comprises at least one emergency egress hatch in said cabin section.

11. A helicopter according to claim 6, wherein said helicopter has a transition section and said at least one component comprises an upper door in said transition section.

12. A helicopter according to claim 6, wherein each said ply is bonded to each of said first and second surfaces by an epoxy structural film adhesive.

13. A helicopter according to claim 12, wherein said epoxy structural film adhesive comprises a 350 degree Fahrenheit curing epoxy structural film adhesive.

14. A helicopter according to claim 6, wherein said self extinguishing composite material comprises a plurality of plies of structural graphite prepreg bonded to each of said first and second surfaces by an epoxy structural film adhesive.

15. A helicopter according to claim 6, wherein each said ply is formed from a graphite cloth impregnated with an epoxy resin.

16. A helicopter according to claim 6, wherein:
    said at least one component comprises an outer skin panel in a cockpit section of said helicopter, an upper cabin door in a cabin section of said helicopter, a lower cabin door in said cabin section, at least one emergency egress hatch in said cabin section, and an upper door in a transition section; and
    said lower cabin door including a plurality of steps and each of said steps being formed from a self extinguishing composite structure.

17. A helicopter comprising:
    at least one component for allowing at least one of human access to and egress from at least one of a cabin and a cockpit section of said helicopter; and
    said at least one component formed from a self extinguishing composite material comprising a core formed from a fire resisting material, which core has a plurality of honeycomb cells having solely fiberglass therein and has a first surface and a second surface, and at least one ply of, a structural graphite prepreg material bonded to the first surface and at least one ply bonded to the second surface.

18. A helicopter comprising:
    means for increasing crew and passenger safety;
    said crew and passenger safety increasing means comprising means for resisting fire forming each of a portion of a cockpit section of the helicopter, an upper cabin door, a lower cabin door, at least one emergency egress hatch, and an upper door in a transition section; and
    each said fire resisting means forming said portion of said cockpit section of the helicopter, said upper cabin door, said lower cabin door, said at least one emergency egress hatch, and said upper door in said transition section comprising an outer skin panel having core means for self extinguishing in event of a fire said core means comprising a honeycomb cell structure formed from a fire retardant material, said honeycomb cell structure having a plurality of cells each filled with fiberglass, means for forming an exterior structural surface and an interior structural surface, and means for bonding said structural surfaces forming means to said core means.

19. A helicopter according to claim 18, wherein said bonding means comprises a 350 degree Fahrenheit epoxy structural film adhesive.

20. A helicopter according to claim 18, wherein at least one of said structural surfaces is formed from a 350 degree Fahrenheit cure graphite cloth material impregnated with an epoxy resin material.

* * * * *